Feb. 12, 1924.                                              1,483,510
                          L. W. BUGBEE
        ACHROMATIC BIFOCAL LENS MADE OF TWO PIECES OF GLASS
                        Filed July 17, 1923
FIG. 1           FIG. 2
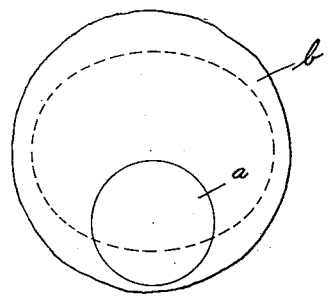   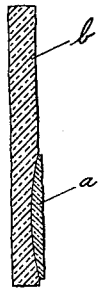
FIG. 3
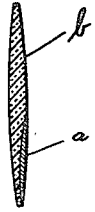
                                            INVENTOR.
                                        LUCIAN W. BUGBEE.
                                    BY
                                                ATTORNEYS.

Patented Feb. 12, 1924.

1,483,510

UNITED STATES PATENT OFFICE.

LUCIAN W. BUGBEE, OF INDIANAPOLIS, INDIANA, ASSIGNOR TO FRANKLIN OPTICAL COMPANY, OF INDIANAPOLIS, INDIANA, A CORPORATION.

ACHROMATIC BIFOCAL LENS MADE OF TWO PIECES OF GLASS.

Application filed July 17, 1923. Serial No. 652,052.

*To all whom it may concern:*

Be it known that I, LUCIAN W. BUGBEE, a citizen of the United States, and a resident of Indianapolis, county of Marion, and State of Indiana, have invented a certain new and useful Achromatic Bifocal Lens Made of Two Pieces of Glass; and I do hereby declare that the following is a full, clear, and exact description thereof, reference being had to the accompanying drawings, in which like numerals refer to like parts.

The object of this invention is to overcome a serious defect in lenses composed of two pieces of glass of different indices of refraction and which lenses are known commercially as Kryptok lenses and may be either of the fused or cemented types.

The said defect is known as chromatic aberration due in the Kryptok lenses heretofore made to the use of a positive lens of flint glass of high relative dispersion attached to a negative lens of crown glass of low relative dispersion.

In order to understand my invention, it is necessary to explain the system of notation for reciprocal relative dispersion ordinarily given in text books, $$\nu = \frac{n-1}{\Delta}.$$

This value $\nu$ is found by dividing the refractive index less unity $(n-1)$ for the D-ray or sodium line by the medium dispersion C to F. The latter is found by subtracting the refractive index less unity for the C-ray from the refractive index less unity for the F-ray, the letters C, D and F representing the so-called Fraunhofer lines in the solar spectrum.

This value $\nu$ for crown glass of index 1.5232, as used commercially for making the present Kryptok lens, has a medium dispersion C to F of substantially .00899 and hence $$\nu = \frac{.5232}{.00899} = 58.2.$$

Value $\nu$ for flint glass ordinarily used for the same purpose has an index of refraction for the D-ray 1.6169 and a medium dispersion C to F of substantially .01691; hence $$\nu = \frac{.6169}{.01691} = 36.5.$$

The full nature of the invention will be better understood from the accompanying drawings and the following description and claims.

In the drawings, Figure 1 is a plan view of a bifocal lens blank of the kind to which this invention relates, the outline of the finished lens being indicated by a dotted line. Fig. 2 is a central vertical section of Fig. 1 before the bifocal side is finished. Fig. 3 is a similar section of the finished lens.

It is obvious to one skilled in the art that if the crown or major lens $b$ is made of glass of index 1.5232 and $\nu$ value 58.2 and the button or reading lens $a$ was made of glass of index 1.6169 with $\nu$ value 36.5 and the lens finished as shown in Fig. 3, $a$ and $b$, that the positive dispersion of $a$ would greatly exceed the negative dispersion of that zone of $b$ which is directly contiguous to $a$ and attached thereto.

According to my invention this defect is overcome in the following manner: I first select a crown glass for the major lens $b$, see Fig. 1, of convenient index of refraction, say 1.5262 for the D line of .01026 and value $\nu$ of 51.3. I assume a reading addition of 2.00 dioptries, that being a good average power.

I next assume a refractive index for the D-ray for the glass of high refractive index for the button $a$, Fig. 1, say 1.6098 and proceed to find the required value $\nu$ for this glass so that its positive dispersion may as nearly as possible neutralize the negative dispersion of $b$.

I find by calculation that the concave depression in $b$ must be —12.59 dioptries, figuring from index 1.5262 or a radius of .0417 meters.

Then the power of the concave depression is —12.59 and of the convex auxiliary lens $a$ is 14.59.

It is obvious that the glass of index 1.6098 must have the same amount of positive dispersion relative to 14.59 dioptries that the glass of index 1.5262 has negative dispersion relative to 12.59 dioptries in order that one may balance or neutralize the other and that, therefore, the combination be substantially achromatic.

In other words, if I divide 12.59 dioptries by value $\nu$ for the glass of which the major lens $b$ is composed and divide 14.59 dioptries by the value $\nu$ for the glass of which the button $a$ is composed, both answers will be alike or a constant and it is this condition that I claim as my invention and as being new in the art.

To illustrate, $$\frac{12.59}{51.3} = .245 \text{ and } \frac{14.59}{.245} = 59.4.$$

Therefore, value $\nu$ for glass of high index is 59.4 and the constant is .245. In other words $$\frac{14.59}{59.4} = \frac{12.59}{51.3} = .245.$$

I do not wish to limit myself exactly to this condition as it is impossible to produce glass having exact optical properties, but I claim substantially the above conditions. In other words, having selected the theoretical value for $\nu$ for both the high index $a$, Fig. 1, and the low index $b$, Fig. 1, so as to comply with the above described condition, I could expect to cover a range of 20% of each value of $\nu$ in each direction. That is to say, the value 59.4 would be allowed a range of not less than 47.5 or more than 71.2, while value 51.3 would be allowed a range of not less than 41 and not over 61.5.

The invention claimed is:

1. A bifocal lens composed of a major portion of glass of a relatively low index of refraction, an added reading portion composed of glass of a relatively high index of refraction, their relative dispersions being such that when the negative dioptral power through the reading portion in the glass of low index of refraction is divided by its value $\nu$ and the positive dioptral power through the reading portion of the glass of high index of refraction is divided by its value $\nu$, the result in each case shall be a constant common to both.

2. A bifocal lens composed of a major portion of glass of a relatively low index of refraction, an added reading portion composed of a glass of a relatively high index of refraction, their relative dispersions being such that when the negative dioptral power through the reading portion in the glass of low index of refraction is divided by its value $\nu$ and the positive dioptral power through the reading portion of the glass of high index of refraction is divided by its value $\nu$, the result in each case shall be a constant common to both and the actual value $\nu$ for each index of refraction shall not vary from the theoretical condition by amount greater than twenty per cent.

In witness whereof I have hereunto affixed my signature.

LUCIAN W. BUGBEE.